(12) United States Patent
Lancelle et al.

(10) Patent No.: US 11,244,519 B2
(45) Date of Patent: *Feb. 8, 2022

(54) DENTAL MODEL ATTRIBUTES TRANSFER

(71) Applicant: Ivoclar Vivadent AG, Schaan (LI)

(72) Inventors: Marcel Lancelle, Zürich (CH); Roland Mörzinger, Attersee am Attersee (AT); Nicolas Degen, Erlenbach (CH); Gábor Sörös, Budapest (HU); Bartolovic Nemanja, Zürich (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,261

(22) Filed: Jul. 8, 2020

(65) Prior Publication Data

US 2020/0342686 A1   Oct. 29, 2020

Related U.S. Application Data

(63) Continuation of application No. 16/279,229, filed on Feb. 19, 2019, now Pat. No. 10,803,675.

(30) Foreign Application Priority Data

Feb. 20, 2018 (EP) .................................. 18157574
Feb. 21, 2018 (EP) .................................. 18157809
Sep. 28, 2018 (EP) .................................. 18197688

(51) Int. Cl.
*G06T 19/20* (2011.01)
*A61C 9/00* (2006.01)
(Continued)

(52) U.S. Cl.
CPC .............. *G06T 19/20* (2013.01); *A61C 9/004* (2013.01); *G06F 30/00* (2020.01); *G06T 15/04* (2013.01);
(Continued)

(58) Field of Classification Search
CPC ......... G06T 19/20; G06T 15/04; G06T 15/50; G06T 17/20; G06T 2210/41;
(Continued)

(56) References Cited

U.S. PATENT DOCUMENTS 7,717,708 B2    5/2010   Sachdeva
9,775,491 B2   10/2017   Clausen
(Continued)

OTHER PUBLICATIONS

SanthaKumar, R. "Three-Dimensional Reconstruction of Cone Beam Computed Tomography Using Splines Interpolation Technique for Dental Application." Sep. 2016. ASME. J. Med. Devices. vol. 10, pp. 1-2. (Year: 2016).*
(Continued)

*Primary Examiner* — Terrell M Robinson
(74) *Attorney, Agent, or Firm* — Ann M. Knab; Thad McMurray

(57) ABSTRACT

The invention pertains to a method for transferring properties from a reference dental model (20) to a primary dental model (10), wherein the method comprises a non-rigid alignment of the primary dental model and the reference dental model, comprising applying an algorithm to minimize a measure of shape deviation between the primary dental model and the reference dental model, and transferring properties of the reference dental model to the primary dental model.

7 Claims, 3 Drawing Sheets

(51) Int. Cl.
*G06T 17/20* (2006.01)
*G06T 15/04* (2011.01)
*G06T 15/50* (2011.01)
*G06F 30/00* (2020.01)

(52) U.S. Cl.
CPC .............. *G06T 15/50* (2013.01); *G06T 17/20* (2013.01); *G06T 2210/41* (2013.01); *G06T 2219/2004* (2013.01); *G06T 2219/2012* (2013.01); *G06T 2219/2016* (2013.01); *G06T 2219/2021* (2013.01)

(58) Field of Classification Search
CPC ..... G06T 2219/2004; G06T 2219/2012; G06T 2219/2016; A61C 9/004; G06F 30/00
See application file for complete search history.

(56) References Cited

U.S. PATENT DOCUMENTS

| | | |
|---|---|---|
| 2002/0010568 A1 | 1/2002 | Rubbert et al. |
| 2006/0147872 A1 | 7/2006 | Andreiko |
| 2006/0183082 A1 | 8/2006 | Quadling et al. |
| 2006/0275736 A1* | 12/2006 | Wen .......... A61C 9/00 433/213 |
| 2007/0168152 A1* | 7/2007 | Matov .......... A61C 7/002 702/155 |
| 2008/0316209 A1* | 12/2008 | Wen .......... A61C 7/00 345/423 |
| 2009/0316966 A1 | 12/2009 | Marshall et al. |
| 2011/0212420 A1 | 9/2011 | Vuillemot |
| 2012/0171642 A1 | 7/2012 | Mehl |
| 2013/0060532 A1 | 3/2013 | Clausen |
| 2013/0158958 A1 | 6/2013 | Methot |
| 2013/0172731 A1 | 7/2013 | Gole |
| 2015/0056576 A1 | 2/2015 | Nikolskiy et al. |
| 2017/0065379 A1* | 3/2017 | Cowburn .......... G06K 9/00228 |
| 2017/0178327 A1 | 6/2017 | Somasundaram et al. |
| 2017/0181816 A1* | 6/2017 | Jordan .......... G06T 19/20 |
| 2017/0319293 A1 | 11/2017 | Fisker |
| 2018/0025529 A1* | 1/2018 | Wu .......... G01J 3/508 345/426 |
| 2018/0085201 A1 | 3/2018 | Wu et al. |
| 2018/0153659 A1 | 6/2018 | Fisker et al. |
| 2018/0182098 A1* | 6/2018 | Andreiko .......... G06T 3/0068 |
| 2018/0333231 A1* | 11/2018 | Somasundaram ..... A61C 9/004 |
| 2019/0043190 A1* | 2/2019 | Sabina .......... A61C 9/0046 |
| 2019/0147666 A1 | 5/2019 | Keustermans et al. |

OTHER PUBLICATIONS

Ning, Dai. "3D Simulation Modeling of the Tooth Wear Process" Aug. 2015. "Public Library of Science", vol. 10. pp. 1-13. (Year: 2015).*

Sorkine, O. et al., "Laplacian Surface Editing," Eurographics Symposium on Geometry Processing, pp. 1-10, The Eurographics Association, 2004.

Dvorak P., "Orthodontic Data Acquisition and Visualization," Website; https://www2.humusoft.cz/www/papers/tcp11/037_dvorak.pdf, Jan. 1, 2011.

* cited by examiner

DENTAL MODEL ATTRIBUTES TRANSFER

CROSS-REFERENCE TO RELATED APPLICATIONS

This application claims priority and is a continuation application of U.S. application Ser. No. 16/279,229, filed Feb. 19, 2019, which claims priority to European patent application No. 18197688.7 filed on Sep. 28, 2018, European patent application No. 18157574.7 filed on Feb. 20, 2018, and European patent application No. 18157809.7 filed on Feb. 21, 2018, all the disclosures of which are incorporated herein by reference in their entirety.

TECHNICAL FIELD

The present invention pertains to a computer-implemented method for transferring attributes, such as colour information, from at least one three-dimensional digital reference dental model to a three-dimensional digital primary dental model. Particularly, the primary dental model and the reference dental model are shaped differently and have different vertices.

More particularly, the present invention pertains to transferring colour information from a coloured three-dimensional model of a full or partial denture to an uncoloured three-dimensional model, having a different geometry than the coloured model. For instance, using the described method, a three-dimensional dental model with photo-realistic colour can be aligned to another three-dimensional dental model without colour for creating a look-up table between the two models. Based thereon, a colour transfer can be done, e.g. using nearest-neighbour matching or ray casting. This facilitates photorealistic rendering of the 3D model and thus improves visualization.

In the context of the present invention, the term "denture" is not necessarily restricted to full dentures but also comprises partial dentures, orthodontic situations or adaptations or dental restorations such as dental prostheses, including crowns, crown lays, veneers, inlays and onlays, bridges, dental implants, implant restorations. Accordingly, the term "dental model" includes all models of dental prostheses that are used for prosthodontic purposes—such as models of complete and partial dentures—as well as models of a patient's actual dental situation that could be partially or fully edentulous.

BACKGROUND

Colour information in three-dimensional (3D) models of dentitions or teeth is important for visualization purposes. The rendering of digital 3D dental models without colour leads to unrealistic and unsatisfactory results and is not suitable for applications that require photo-realistic visualization.

Previous technical approaches tried to render 3D dental models with fixed colour pre-sets, e.g. a whitish colour for the part of the denture referring to teeth, and a reddish colour for the part of the denture referring to the gingival area.

Some dental scanners exist that can capture the colour information of patients during the scanning and 3D model generation process. Also, some three-dimensional models used in software programs, such as CAD software, have been created with a fixed or pre-set colour for the teeth and gingival area. However, many scans of teeth or scans of casts or other dental 3D models such as digital mock-ups do not contain colour.

In entertainment industry, colour is applied by a skilled artist, e.g. painting and using a person or photos as reference. This lengthy and costly procedure is neither feasible for nor does it fulfil the requirements of medical purposes, e.g. with respect to accuracy and reproducibility.

Colourization of digital 3D dentures assumes either that the colour is captured during a scanning process (e.g. intra-oral scanning with colour) or that the colour is fixed or pre-set in the 3D dental model, e.g. taken from a library of teeth or dentures. For the latter case, the current state-of-the-art for the colourization of dental 3D models assumes fixed and non-photorealistic colour or texture uniformly distributed per 3D model or at least parts thereof. Existing approaches are not able to take into account the variety in dentitions and particularly their geometries.

The problem of transferring colour from a 3D dental model with photo-realistic colour to a 3D dental model without a colour requires a highly accurate correspondence between the two 3D models.

U.S. Pat. No. 9,775,491 B2, which is hereby incorporated by reference in its entirety, discloses a computer implemented method for visualizing an image rendered from a three-dimensional model of a dental situation to an image of the face of the patient recorded by a camera. In this method a three-dimensional model of the oral cavity of the patient is obtained. This three-dimensional model is modified in a dentistry treatment plan by applying dental restorations to obtain a three-dimensional model of the dental situation of the patient dentition after application of the dental restorations. A two-dimensional image of the face of the patient including the mouth opening is obtained. Then the positioning of the camera that recorded the image relative to the dentition of the patient is estimated. In this application "positioning of the camera" meant to include the three-dimensional position x, y, z in space and the angular orientation of the camera with respect to the face of the patient. A virtual camera using the estimated positioning is processing the three-dimensional model of the dental situation to obtain a two-dimensional image, and a portion of the three-dimensional model of the dental situation is selected which is visible to the virtual camera. The image rendered by the virtual camera is overlaid and displayed in the image taken by the camera.

Similar methods are set forth in US 2011212420 directed to a method of forming a dental mold, US 20130060532 directed to a method of composing and designing teeth, US 2013158958 directed to a dental analysis method and system, US 20170319293 directed to a method of digitally designing a modified dental setup, and U.S. Pat. No. 7,717,708 directed to computer-based methods for supporting dentists during dental treatment planning for a patient, all of which are hereby incorporated by reference in their entirety.

SUMMARY

It is therefore an object of the present invention to provide a method for adding properties to three-dimensional dental models.

It is another object to provide such a method wherein the properties comprise colour information.

It is a particular object to provide such a method wherein a photorealistic colour can be added to the dental models.

It is another object to provide such a method that is performed fully or semi-automatically.

It is a further object to provide such a method wherein the colour information or other properties are transferable from another dental model, particularly from a differently shaped dental model.

At least one of these objects is achieved by the method of the claims.

The invention pertains to computer-implemented methods for transferring properties from one or more reference dental models to a primary dental model. In particular, the dental models are digital three-dimensional models of a denture (either complete or partial denture, particularly comprising at least six teeth), the denture comprising false and/or real teeth with or without gum (gingiva).

According to a first aspect of the invention, the method comprises
- a non-rigid alignment of a primary dental model and a reference dental model, comprising applying an algorithm—such as, for instance, an Iterative Closest Point (ICP) algorithm—to minimize a measure of shape deviation between the primary dental model and the reference dental model, and
- transferring properties of the reference dental model to the primary dental model.

In one embodiment, the primary dental model and the reference dental model are in a polygon mesh format. The primary dental model may comprise a first plurality of vertices and the reference dental model may comprise a second plurality of vertices, wherein each vertex of at least a subset of the second plurality of vertices has a property assigned to. In this case, according to one embodiment of the method, the non-rigid alignment of the primary dental model and the reference dental model comprises non-rigidly aligning at least a subset of the first plurality of vertices and the second plurality of vertices, and transferring the properties of the reference dental model to the primary dental model comprises transferring properties of the second plurality of vertices to the first plurality of vertices, so that each vertex of at least a subset of the first plurality of vertices has a property assigned to.

According to another embodiment, the method comprises—for at least a subset of vertices of the primary dental model—performing a nearest-neighbour search in the reference dental model to determine a nearest-neighbour vertex in the reference dental model for each vertex of at least the subset of vertices, and assigning the property of the nearest-neighbour vertex of the reference dental model to the respective vertex of the primary dental model.

According to another embodiment of the method, the non-rigid alignment comprises computing a look-up table and transferring the properties is performed based on the look-up table.

According to a further embodiment, the method comprises a rigid alignment of the primary dental model and the reference dental model.

In one embodiment the rigid alignment comprises executing, in particular before starting executing the ICP algorithm, a Rigid Alignment algorithm on the primary dental model and the reference dental model to superimpose the primary and the reference model with a minimized shape deviation.

In another embodiment the rigid alignment comprises translations, rotations and size scaling transformations of the primary dental model and/or the reference dental model in an iterative optimization process.

In another embodiment the rigid alignment comprises applying Procrustes analysis to the primary dental model and the reference dental model to obtain an affine transformation to superimpose the primary and the reference model with minimized Procrustes distance between the primary and the reference dental models after the affine transformation.

According to another embodiment, the method comprises computing a deformed model based on the non-rigid alignment, the deformed model comprising a third plurality of vertices, wherein a number of vertices of the third plurality of vertices corresponds to that of the first plurality of vertices or to that of the second plurality of vertices.

In one embodiment the number of vertices of the third plurality of vertices corresponds to that of the first plurality of vertices, computing the deformed model comprises minimizing a shape deviation of third plurality of vertices to the second plurality of vertices, each vertex of the first plurality of vertices and each vertex of the third plurality of vertices have a corresponding index assigned, and transferring properties comprises transferring the properties of the second plurality of vertices from to the third plurality of vertices, and assigning each vertex of the first plurality of vertices the property of the vertex of the third plurality of vertices that has the corresponding index.

A method for transferring properties from one or more reference dental models to a primary dental model according to a second aspect of the invention uses statistical information of one or more reference models to transfer a local average of attribute values to the primary dental model. Each of the models (i.e. the primary dental model and the one or more reference dental models) comprises localized attribute information related to the properties, the localized attribute information being assigned to a multitude of surface points on the model, wherein each surface point of at least a subset of surface points of each of the one or more reference dental models has a property assigned to. The surface points for instance can be vertices or voxels of the model. According to this aspect, the method comprises interpolation or approximation of properties of one or more reference models, based on at least two of the variables position, surface orientation, surface curvature, segmentation of teeth and gingiva, and ambient occlusion (or any combination derived from these variables). The method further comprises transferring properties of the one or more reference dental models to the primary dental model according to the interpolation or approximation.

According to one embodiment, the method comprises an approximation of properties of one or more reference models, based on a multiple linear regression model.

According to another embodiment, the method comprises an interpolation of properties of one or more reference models, based on local weighted averages or radial basis function.

According to another embodiment of the method, the interpolation or approximation is based on position and local curvature information.

According to one embodiment, the local curvature information comprises information related to a concave curvature above and below a local region of a surface point, particularly wherein a high value is assigned for a concave curvature above the local region and a low value is assigned for a concave curvature below the local region.

According to a further embodiment, the method comprises
- assigning weight values to the localized attribute information of at least a plurality of surface points of the subset of surface points of the of the one or more reference dental models, and transferring properties of the one or more reference dental models to the primary dental model according to the assigned weight values, so that at least a plurality of surface points of primary dental model has a property assigned to.

In one embodiment of the method, the surface points are vertices, wherein the primary dental model comprises a first plurality of vertices and the one or more reference dental model each comprise a further plurality of vertices, wherein each vertex of at least a subset of each further plurality of vertices has a property assigned to. According to this embodiment the method comprises:

calculating, for at least a subset of vertices of the first plurality of vertices, a distance to at least a multitude of vertices of each further plurality of vertices, assigning weight values to the properties based on the calculated distances, and transferring properties of the one or more further pluralities of vertices to the first plurality of vertices according to the assigned weight values, so that at least a plurality of vertices of the first plurality of vertices has a property assigned to.

According to one embodiment, a weight value is assigned to each property assigned to a vertex of the multitude of vertices, wherein the weight value is assigned according to the calculated distance to the vertex, a higher weight value being assigned the shorter the calculated distance is.

In a particular embodiment, transferring the properties comprises calculating a mean or average value based on the weight values, and assigning a property to each vertex of the subset according to the mean or average value.

According to another embodiment, the method comprises calculating, for at least a plurality of surface points of the primary dental model, a distance to a multitude of surface points on each of the one or more reference dental models, wherein calculating the distance is based on positions and normals, and assigning the weight values is based on the calculated distances.

In particular, a higher weight value is assigned the shorter the calculated distance is. Calculating the distance optionally is further based on curvature information and/or on ambient occlusion.

According to one embodiment, this method further comprises a non-rigid alignment of the primary dental model and the one or more reference dental models, comprising applying an algorithm to minimize a measure of shape deviation between the primary dental model and the one or more reference dental models.

According to another embodiment of this method, transferring the properties comprises calculating a mean or average value based on the weight values, and assigning a property to each vertex of the subset according to the mean or average value.

According to an embodiment of either method, the properties comprise colour information. In particular, the reference dental model or models comprise photorealistic colour information, transferring colour information comprises using cross polarized lighting, and/or the properties further comprise information regarding opacity, translucency, and/or texture coordinates.

According to a further embodiment of either method, a property is assigned to each vertex of the second plurality of vertices.

According to another embodiment of either method, the properties of the second plurality of vertices are transferred to the first plurality of vertices, so that each vertex of the first plurality of vertices has a property assigned to.

According to yet another embodiment of either method, transferring the properties is performed based on ray-casting.

The invention also pertains to a computer programme product comprising programme code which is stored on a machine-readable medium, or being embodied by an electromagnetic wave comprising a programme code segment, and having computer-executable instructions for performing one of the above methods.

BRIEF DESCRIPTION OF THE DRAWINGS

The invention in the following will be described in detail by referring to exemplary embodiments that are accompanied by figures, in which.

DETAILED DESCRIPTION

Figure 1:
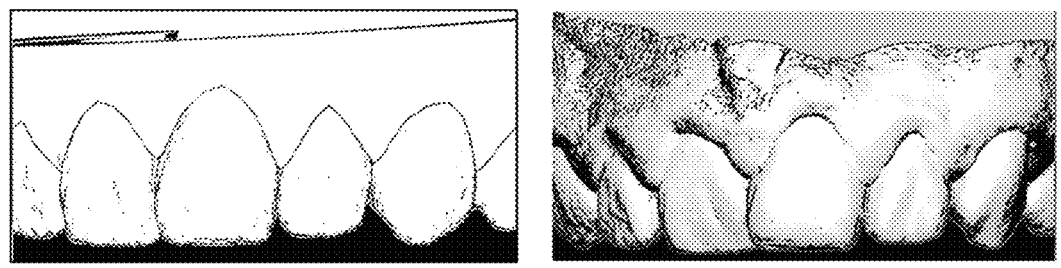
FIG. 1 shows two three-dimensional digital dental models.

FIG. 1 depicts two digital dental models, one being coloured and one being uncoloured. Colour information in dental models is important for visualization purposes. State-of-the-art colourization of digital dental models uses fixed and non-photorealistic colour or texture uniformly distributed per 3D model. In the field of artificial dentition, the rendering of digital models without realistic colour information, in particular photo-realistic colour information, leads to unsatisfactory results. Existing approaches are not able to take into account the variety in dentitions and particularly their geometries.

In the following a method for transferring properties from one digital dental model to another one is described, the method allowing colouring an uncoloured model by transferring colour information from a coloured model to an uncoloured model. More specifically, a method for denture colour transfer is described that allows semi-automatic colouring of digital 3D dental models by providing a reference coloured dental model.

The input to the algorithm consists of two dental models. The first one, the "primary dental model" 10, is the one that will be coloured in the end. The second one is the coloured "reference dental model" 20, the colours of which are to be transferred onto the primary dental model.

Although a full denture (of the upper jaw) is shown here, the method can be performed as well for partial dentures, e.g. comprising only six front teeth or even fewer teeth.

Figure 2:
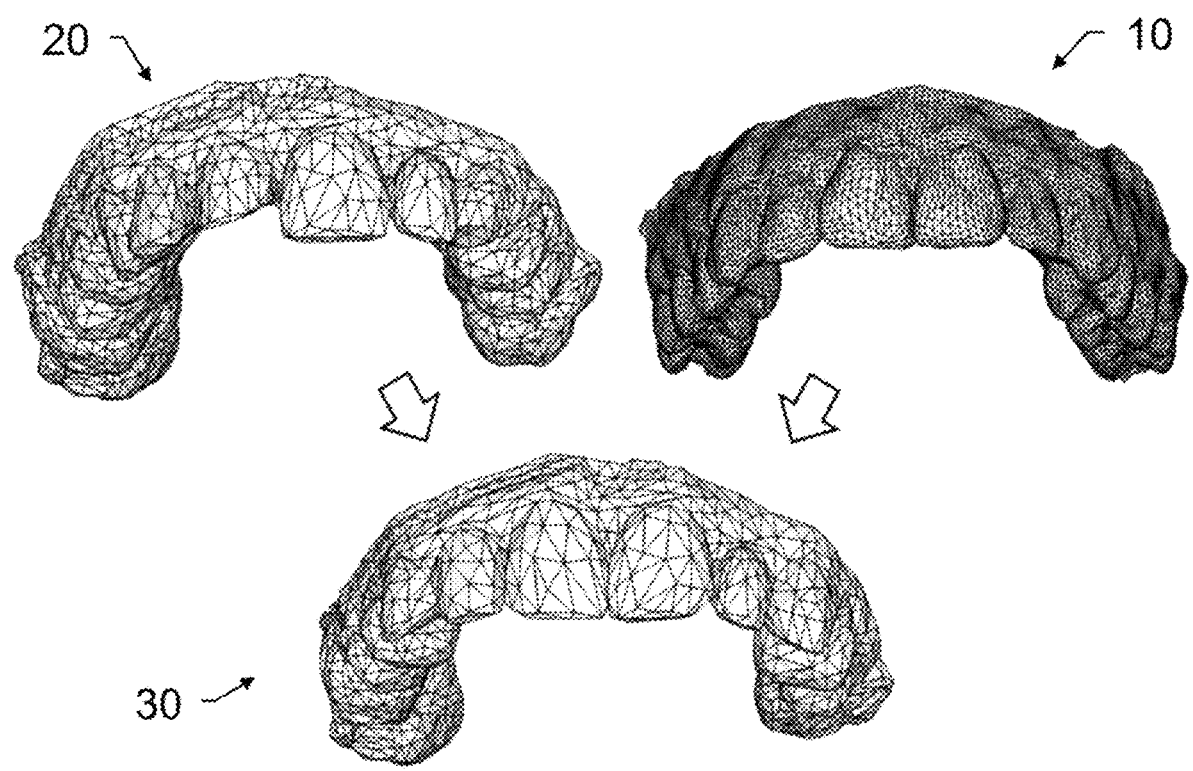
FIG. 2 shows aligning a primary dental model and a reference dental model to generate a deformed model.

FIG. 2 shows a primary dental model 10 and a reference dental model 20 that are both in a polygon mesh format. For instance, the digital models are generated by means of scanning of teeth, casts or other dentures.

In this example, each digital dental model comprises a plurality of vertices. The models are shaped differently and their vertices differ with respect to their number and their interconnections. However, the method can also be performed with models that have other 3D representations such as parametric surfaces, subdivision surfaces or the like.

One or more properties are assigned to each of the vertices of the reference dental model 20—or at least to each of a subset of the vertices. These properties are to be transferred to the primary model.

In particular, the properties comprise a colour information. The output is then a colourization of the primary dental model, such that at least a multitude of vertices of this model, particularly every vertex, has a valid colour value attached to it.

For instance, the reference model can have photorealistic colour information that is to be transferred to the primary model. Moreover, the properties may comprise opacity or translucency values or texture coordinates. The properties can also comprise other dental attributes such as a tooth ID, tooth decay or layer thickness.

To allow the transfer of colour information or other properties, the primary dental model 10 and the reference dental model 20 are non-rigidly aligned. As shown in FIG. 2, according to an exemplary embodiment of the method according to the invention, a deformed model 30 may be created. The deformed model 30 is either based on a deformation of the vertices of the primary model 10 to the shape of the reference model 20, or based on a deformation of the vertices of the reference model 20 to the shape of the primary model 10. Also deforming both sets of vertices to arrive at a common shape (e.g. an intermediate shape) is possible.

In one embodiment, the method according to the invention comprises an automatic or semi-automatic transfer of colour information from one digital dental 3D model with colour information to another digital dental 3D model using non-rigid alignment of the geometries followed by a lookup-based colour transfer. The task is to create a highly accurate correspondence between a 3D dental model with photorealistic colour and a 3D dental model without a colour and a subsequent transfer of the colour information. It is accomplished using two steps: Firstly, a non-rigid alignment of the two 3D dental models and secondly, a lookup of the colour in the 3D dental model with colour to transfer the colour to the target 3D dental model using nearest-neighbour search or ray casting.

Figure 3A:
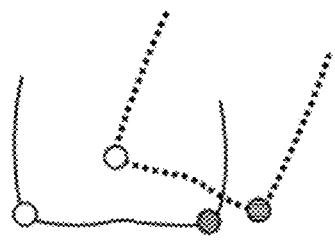
FIGS. 3a-d illustrate an alignment of two dental models.

The alignment process is illustrated in FIGS. 3a-d, where FIG. 3a shows the two models (one with colour and one without colour) in an unaligned state.

Figure 3B:
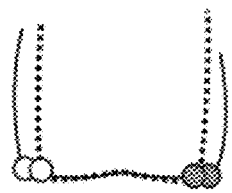

The alignment process basically comprises two steps, wherein in the first step, illustrated in FIG. 3b, the two models are aligned as close as possible without any deformations applied on the models' vertices themselves ("rigid alignment"). This step can be done either automatically or using known 3D correspondence vertices.

Figure 3C:
Figure 3D:
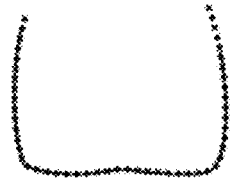

The second step, illustrated in FIGS. 3c and 3d, involves finding the deformation of at least one of the two models such that when deformed, the surfaces of each other closely match, by following its contours, curvature and other spatial features ("non-rigid alignment"). As the two models are dental models, this means, for instance, that corresponding teeth are properly aligned. This deformation can be based on methods such as constrained convex optimization, energy minimization techniques and non-linear least squares minimization algorithms. The constraints for the algorithm can be a set of 3D correspondence vertices between the models or randomly selected correspondences using Iterative Closest Points technique.

The output of such an algorithm can be a bijective map for each individual vertex in the primary (colourless) model, such that when applied, allows the primary model to approximate the surface of the reference model.

Given that the models are aligned and that their surfaces are closely matching, the colour transfer can be performed e.g. using nearest-neighbour search or ray casting.

Using nearest-neighbour search, for every vertex in the colourless model, the closest vertex is found in the model with colours and its colour is assigned to the vertex of the colourless model.

Using ray casting, to every vertex in the primary model the interpolated colour found at the points of intersection with the reference model is assigned. This is achieved using one ray constructed from the corresponding vertex position and normal direction and one ray constructed from the corresponding vertex position and the opposite normal direction. The resulting colour is selected from the closer of the two intersections. As an additional processing step, a colour diffusion step can be applied to further improve the colour transfer results.

When the colourless model has a colour value assigned to its vertices, a simple colour transfer is assigned to the original non-deformed model. For every vertex of the deformed mesh with colours, its colour value is copied into the original corresponding vertex. As a result, a non-deformed mesh is obtained with colours that closely match the model with colours that was initially selected as the target.

Figure 4:
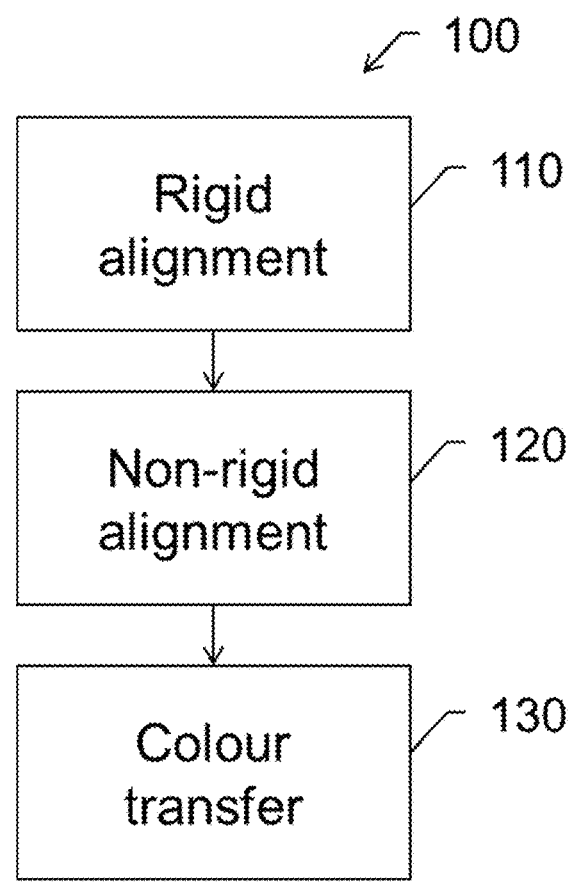
FIG. 4 shows a method for transferring colour information from a reference model to a primary model.

In one embodiment, as illustrated in FIG. 4, the three main steps of the method 100 performed by the algorithm are as follows:
1. Rigid alignment of the dentures;
2. Non-rigid alignment of the dentures; and
3. Colour transfer between the dentures.

In the first step 110 (rigid alignment of the dentures), the primary and coloured dental models are coarsely aligned without any deformations. This means that after such an alignment, the distances between the vertices of a given model are preserved.

The alignment itself can be done using several methods, which range from fully automatic solutions based on heuristics and machine learning methods or provided known correspondences. In the latter method, there exists a set of vertices in the primary dental model which are semantically corresponding (e.g. vertices are part of the same gum line, or represent the same central point on a tooth) to a set of vertices in the coloured dental model.

Based on these correspondences, one can infer optimal rigid transformation that will orient the primary model to closely match the coloured model. A method that can be used in step 110 is based on Kabsch algorithm (Kabsch, Wolfgang (1976): "A solution for the best rotation to relate two sets of vectors"). The main importance of the rigid alignment lies in the fact that the next step, non-rigid alignment, can be performed with greater accuracy.

The second step 120 (non-rigid alignment of the dentures) aims at finding the deformation transform of the primary dental model such that its surfaces, contours and other spatial features closely match those of the coloured dental model (e.g. matching gum lines and teeth are in the same location). This process involves performing geometric operations on the primary dental model such as local and non-linear stretching and shrinking.

The problem of geometric warping can be elegantly described using iterative optimization methods based on non-linear least squares as objective functions (see, e.g., C. T. Kelley (1999): "Iterative Methods for Optimization"). The goal of the optimization process is to reduce the topological differences between the primary and the coloured reference dental models. In order to provide heuristics and guidance for the iterative optimization method, several constraints can be provided such as sets of matching correspondence points as in the first step and sets of matching contours which describe sections of the surface of the primary dental model which should remain visually the same after the deformation. Similarly, Iterative Closest Point method (see, e.g., Rusinkiewicz, Szymon and Levoy, Marc (2001): "Efficient variants of the ICP algorithm") is used to provide additional constraints on randomly selected vertices of the primary dental model to improve the convergence and accuracy of the optimization process.

As a result of this step, a new deformed dental model is produced (at least theoretically) which has the same connectivity and number of vertices as the primary dental model, but has shape that is nearly identical to the shape of the coloured dental model.

In the third step 130 (colour transfer between the dentures), given that the deformed and coloured dental models are now accurately aligned, the colour transfer can be performed by using methods such as nearest-neighbour search or ray casting.

Using nearest-neighbour search, for every vertex of the deformed dental model the closest vertex belonging to the coloured dental model can be found using a metric distance such as Euclidean distance. Consequently, the colour value of the closest vertex can be assigned to the vertex of the deformed dental model.

Alternatively, by using ray casting, at each vertex of the deformed dental model, two rays are constructed using the vertex position and normal. One ray is constructed in the direction of the normal and the other in the opposite direction. Both rays have the goal to find the closest triangle that belongs to the coloured model. As a result of this ray cast, the corresponding interpolated colour of the result which is closer is assigned to the vertex of the deformed dental model. In case that the ray casting does not intersect any triangle of the coloured dental model, the colour of the closest neighbour in the deformed dental model is assigned which has already been assigned a valid colour.

Optionally, as an additional processing step, a colour diffusion step is applied to reduce high frequency patterns in the colours of the deformed dental model.

In order to assign colour values to the vertices of the primary dental model, a bijective mapping is performed from the deformed model onto the primary model because they have the same number of vertices, indexed in the same order. The colour value of the corresponding deformed dental model is assigned to every vertex of the primary dental model. As a result, the primary dental model is now coloured visually similarly to the coloured dental model and can be visualized to a user.

Optionally, transferring the colour information may comprise using cross polarized lighting to remove reflexions.

FIGS. 5a-e illustrate an example for non-rigid alignment of two sets of vertices using an Iterative Closest Point (ICP) algorithm. ICP is an algorithm employed to minimize the difference between two clouds of points.

In the example of FIGS. 5a-e, the black line represents the vertices of the primary model, and the intermittent line represents the vertices of the reference model.

Figure 5A:
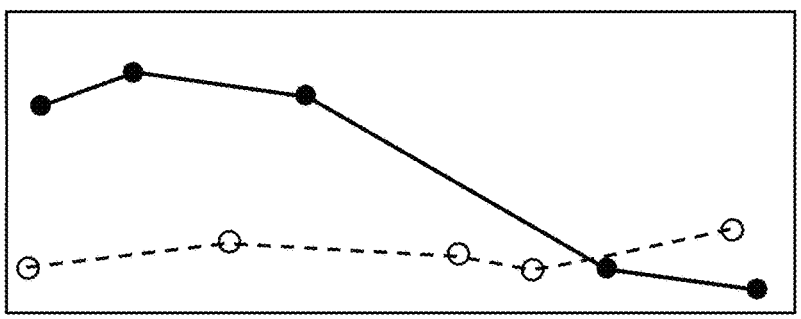
FIGS. 5a-e illustrate a non-rigid alignment using an Iterative Closest Point algorithm.

FIG. 5a shows the situation before the start of the non-rigid alignment, the shape of the two models showing strong deviations.

Figure 5B:
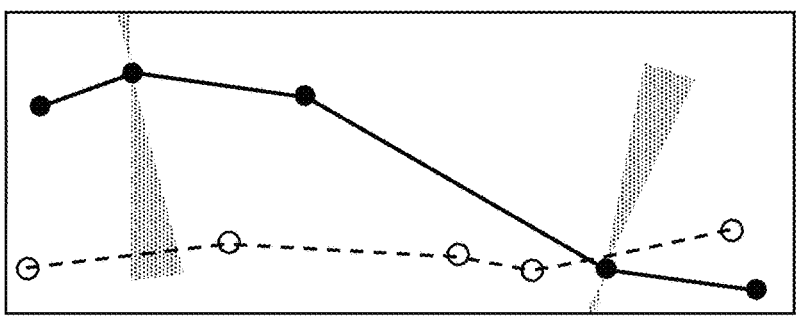
Figure 5C:
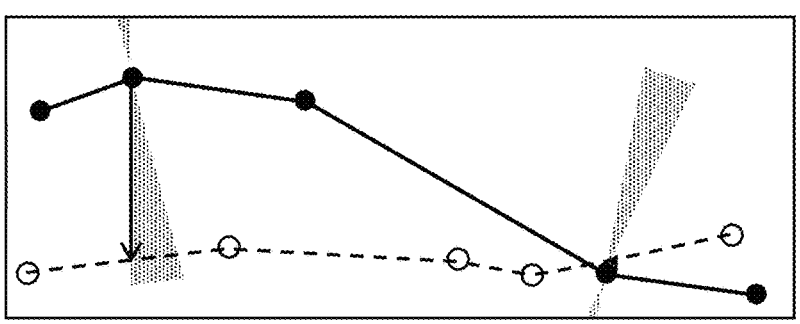

The vertices of the primary model are deformed to match the shape of the reference model. For each point or a selected set of points in the primary model point cloud, the closest point in the reference model point cloud is matched. In the example of FIGS. 5b and 5c, every second point in the primary model point cloud is selected. A combination of rotation and translation is estimated using a root mean square point to point distance metric minimization technique which will best align each source point to its match found in the previous step. This step may also involve weighting points and rejecting outliers prior to alignment.

Figure 5D:
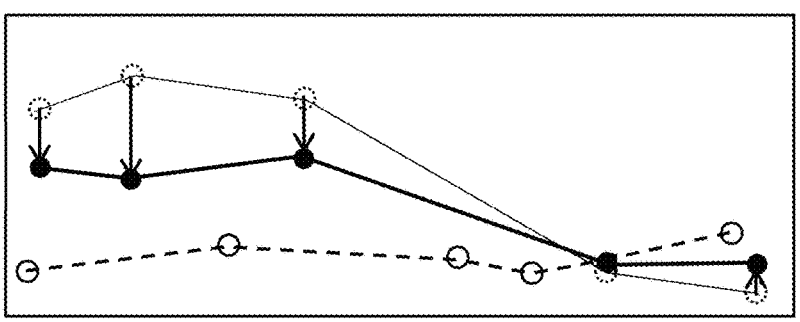
Figure 5E:
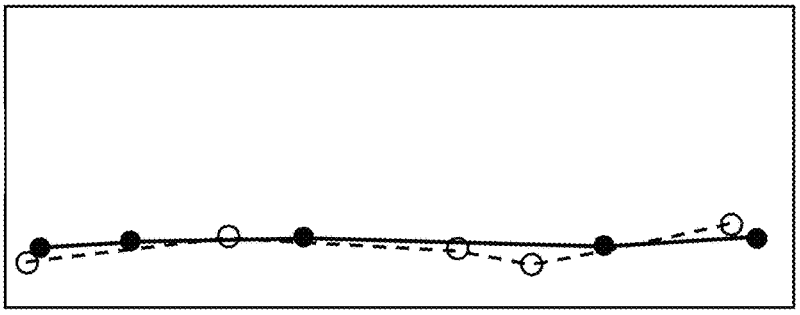

As shown in FIG. 5d, the source points are transformed using the obtained transformation. Finally, FIG. 5e shows the result after a number of iterations: The vertices of the primary model have been deformed to closely match the shape of the reference model, so that the properties, such as colour information can be transferred.

Another embodiment of the method according to the invention uses statistical information of one or more reference models to transfer a local average of colour or other attribute values to the primary model. In case the attribute is a colour value, for each vertex of a mesh to be coloured (e.g. each vertex of the primary model), a colour is determined using meshes of one or more reference models. Instead of vertices, other surface points such as voxels can be used as well. For this embodiment of the method, all meshes are assumed to be in the same—or at least a similar—coordinate system. A distance from the vertex (v) of the primary model to every vertex (v_ref) of the reference model (or models) is computed. To compute the distance between the vertices, the positions, normals and curvature information of the respective reference model can be used; optionally, also ambient occlusion can be used.

When the distances have been computed, the attribute values of the vertices are weighted. For a close distance, a higher weight is chosen, so that the colour of the closest reference model vertex has a higher impact on the colouring of the primary model vertex. With the weighted values, an average or mean value can then be calculated (e.g. a colour value) and applied to the vertex of the primary model.

In one embodiment of the method, a target mesh and a reference mesh are given. The attribute interpolation can be implemented with a weighted local average. For a vertex i of the target mesh to be coloured, for every vertex j in the reference mesh a distance_ij^f can be computed for each feature f. Every distance_ij^f can be weighted and thresholded so that for a similar reference feature value a high weight ij^f is obtained and conversely 0 is obtained for a dissimilar feature. The weights for all features can be combined by multiplication to a final weight w_ij which is used to weight the attributes contribution from that reference vertex.

To each colour or other attribute information a weight may be assigned. Alternatively, a nearest-neighbour search can be performed.

This embodiment of the method can be used with one or more than one reference models. If more than one reference models are used, an average or mean value can be calculated using the weighted values from vertices of all reference models. To bring the primary model and the reference models into the same coordinate system, a rigid alignment can be performed as described further above. In one embodiment, the primary model and the one or more reference models can be aligned by deforming the dental arches of one or more of the models. Optionally, also a non-rigid alignment can be performed.

Instead of being based on a calculated distance, computing a weight value may also be based on some statistic analysis, such as multivariate interpolation, multiple linear regression or polynomial regression. For instance, a number of functions may be found that describe the data, and the weight can be calculated for a linear combination of these functions that best approximates the data. For instance, if it is assumed that a brightness level or an intensity of red depends on the Z position, three parameters could be determined for a constant, a linear and a squarish relationship.

In another embodiment, the reference colour information is stored in an acceleration structure such as a regular grid, allowing to discard information with no contribution early.

In an exemplary embodiment, a method for generating a dental model is provided. In the method, a primary dental model comprising a set of 3D coordinates is received at a processor. A reference dental model is received at the processor, the reference dental model comprising a set of 3D coordinates. A morphed dental model is generated by the processor by non-rigidly aligning the primary dental model and the reference dental model to minimize a shape deviation between the primary dental model and the reference dental model. For example, the primary dental model may be non-rigidly aligned to the reference dental model. In this case, the morphed dental model includes coordinates which map to a coordinates of the primary dental model. In another case, the reference dental model may be non-rigidly aligned to the primary model. In this case, the coordinates of the morphed dental model will map to coordinates of the reference dental model. In some embodiments, both the primary and the reference dental models are non-rigidly aligned to each other.

In some embodiments of the method, for each coordinate of the morphed dental model (where coordinates map to the primary dental model), a corresponding coordinate of the reference dental model is calculated. In some embodiments where the morphed dental model maps to the reference dental model, corresponding coordinates of the primary dental model are calculated.

For every coordinate of the primary model, a property value is applied based on one or more property values of the reference dental model. For example, a property value interpolated from the reference model may be applied to each coordinate of the primary dental model.

Another exemplary embodiment provides a method for transferring properties from one or more reference dental models to a primary dental model. Each of the reference models and the primary models include coordinates, and at least a subset of the coordinates of each of the one or more reference dental models has a property assigned thereto. The properties of the one or more reference models are interpolated and/or approximated based on at least two of: position, surface orientation, surface curvature, segmentation of teeth and gingiva, and ambient occlusion.

In the context of the present invention, the term "denture" is not necessarily restricted to full dentures but also comprises partial dentures or orthodontic situation/adaptations or dental restorations such as dental prostheses, including crowns, crown lays, veneers, inlays and onlays, bridges, dental implants, implant restorations. Accordingly, the term "dental model" includes all models of dental prostheses as well as the patient situation that could be partial or fully edentulous—such as models of complete and partial dentures—that are used for prosthodontic purposes.

In some embodiments, the present disclosure is implemented using a system having a camera, a processor, an electronic data storage unit, and a display. The camera can be a standard camera, an infrared dot-projection detector, flood illuminator camera, structured-light three-dimensional scanner, standard infrared detector, ultrasonic imaging device, Doppler detector, or any other suitable visualization system capable of capturing information related to a patient's dentition. The processor can be a single processor having one or more cores, or a plurality of processors connected by a bus, network, or other data link. The electronic data storage unit can be any form of non-transitory computer-readable storage medium suitable for storing the data produced by the system. The display can be any display suitable for displaying a digital color or grayscale image.

In some embodiments, the camera, processor, electronic data storage unit, and digital display are components of a single device. The single device may be a smartphone, tablet, laptop computer, personal digital assistant, or other computing device.

In some embodiments, the processor is in communication over a network, which could be wired or wireless, with an external processor used for performing one or more calculation steps and/or a network-attached electronic data storage unit. In some embodiments, the present disclosure makes use of cloud computing to perform one or more calculations steps remotely and/or remote storage to enable the storage of data remotely for collaborative or remote analysis. In some embodiments, the system comprises a plurality of graphical user interfaces to permit multiple users to view or analyze the same data.

In some embodiments, the system operates to provide one or more users with a visualization of a virtual dental model of a patient's teeth, which may be altered to visualize the effect of one or more dental or orthodontic alterations. In some embodiments, this allows the one or more users to visualize a "before" dentition image, i.e., the appearance of a patient's dentition prior to a dental or orthodontic procedure, and an "after" dentition image, i.e., a representation of the expected appearance of a patient's dentition after a proposed dental or orthodontic procedure.

In some embodiments, the system operates by capturing information related to a patient's dentition using a camera, creating a model of the patient's dentition on a processor, fitting a model of a proposed post-alteration dentition to the patient's dentition on the processor, coloring the model of the proposed post-alteration dentition to match an expected real post-alteration coloration, and displaying the fitted model of the proposed post-alteration dentition in place of the patient's actual dentition on a display which otherwise shows the patient's actual facial features. The information related to a patient's dentition, the model of the patient's dentition, and the model of the proposed post-alteration dentition may be stored on an electronic data storage unit. In some embodiments, the operations are performed in real-time.

In some embodiments, a user interface is configured such that a user may view the "before" dentition image and the "after" dentition image simultaneously either side-by-side or with a full or partial overlay.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A method for transferring properties comprising colour information from one or more reference dental models to a primary dental model, each model comprising localized attribute information related to the properties, the localized attribute information being assigned to a multitude of surface points on the model, wherein each surface point of at least a subset of surface points of each of the one or more reference dental models has a property assigned to it, wherein the method comprises:
   point to point interpolation of properties of the one or more reference models, based on at least two of:
      position of each surface point,
      surface orientation of each surface point,
      surface curvature of each surface point,
      existing segmentation of teeth and gingiva of each surface point, and
      ambient occlusion of each surface point; and
   transferring properties of the one or more reference dental models to the primary dental model according to the interpolation.

2. The method according to claim 1, characterized by the interpolation of properties of the one or more reference dental models is based on a multiple linear regression model.

3. The method according to claim 1, characterized by the interpolation of properties of one or more reference dental models is based on local weighted averages or radial basis function.

4. The method according to claim 1, characterized in that the interpolation is based on position and local curvature information.

5. The method according to claim 4, characterized in that the local curvature information comprises information related to a concave curvature above and below a local region of a surface point, particularly wherein a high value is assigned for a concave curvature above the local region and a low value is assigned for a concave curvature below the local region.

6. The method according to claim 1, characterized in that the colour information comprises photorealistic colour information,
   transferring the colour information comprises using cross polarized lighting, and/or
   the properties further comprise opacity, translucency, and/or texture coordinates.

7. A computer programme product comprising programme code which is stored on a non-transitory machine-readable medium, the non-transitory machine-readable medium comprising computer instructions executable by a processor, which computer instruction cause the processor to perform the method according to claim 1.

* * * * *